Feb. 9, 1960
I. P. WILLIAMS
2,924,422
HOSE OPERATED VALVE
Filed July 18, 1955
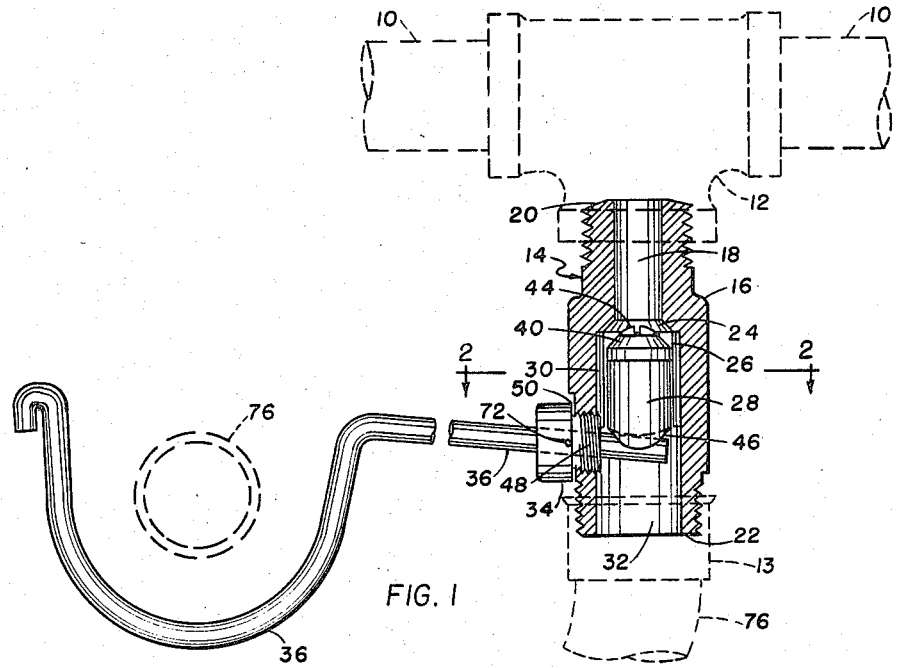
FIG. 1
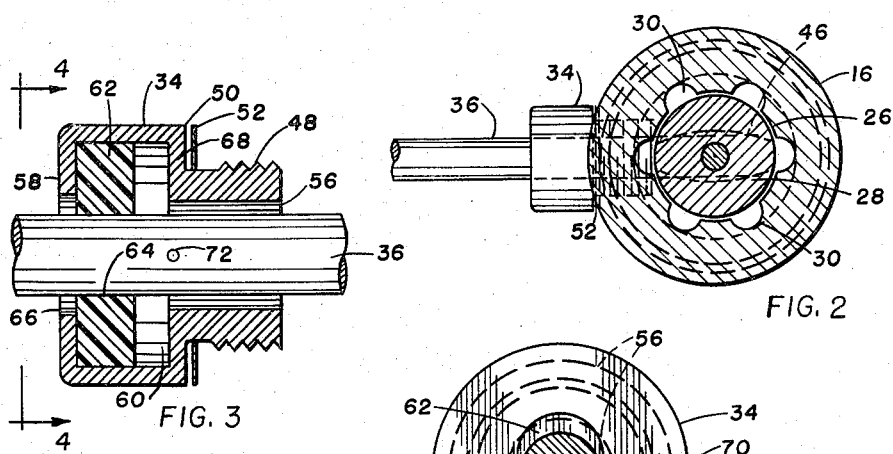
FIG. 3
FIG. 2
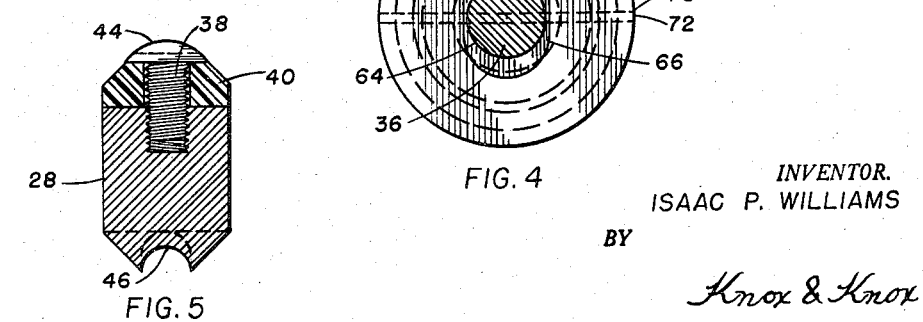
FIG. 4
FIG. 5
INVENTOR.
ISAAC P. WILLIAMS
BY
Knox & Knox

United States Patent Office 2,924,422
Patented Feb. 9, 1960

2,924,422

HOSE OPERATED VALVE

Isaac P. Williams, San Diego, Calif.

Application July 18, 1955, Serial No. 522,677

2 Claims. (Cl. 251—237)

The present invention relates generally to valves and more particularly to externally operable valves.

The primary object of this invention is to provide a shut-off valve for use in lawn sprinkling, in combination with a support for a hose, the valve being operated by said hose.

Another object of this invention is to provide a valve of the above mentioned character which is operable by means of a vertical downward load exterior to said valve.

Another object of this invention is to provide a valve of the above mentioned character in which the wear on moving parts is minimal.

Another object of this invention is to provide a valve which is adapted for fabrication from many different materials, so that the choice of material can be according to the dictates of availability and price considerations, the exact sizes and proportions being matters easily determined to suit particular conditions and needs.

Another object of this invention is to provide a valve which is practicable and inexpensive to manufacture.

Finally, it is an object to provide a valve assembly ideally suited for use with fire hoses, or hoses which may be used as fire hoses in homes.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Fig. 1 is a drawing of the valve partially sectioned along the vertical axis showing the arrangement of the actuating lever and hose supporting hook and the general construction of the valve, a water pipe and water hose being indicated in dash line.

Fig. 2 is a fragmentary cross sectional view at line 2—2 in Fig. 1 showing details of the water channels.

Fig. 3 is a partially sectioned view of the means for mounting and sealing the lever.

Fig. 4 is an end view of the structure illustrated in Fig. 3.

Fig. 5 is a vertical sectional view of the valve element showing the detail construction of the valve element.

Similar characters of reference indicate similar or identical elements and portions throughout the specification and throughout the views of the drawing.

Referring now to the drawings, and specifically to Fig. 1, there is shown a supply pipe 10 engaging a pipe T-connection 12 affording a means of support and water supply for a valve assembly 14.

The valve body 16 is a hollow cylinder and has an externally threaded inlet portion 18 at one end for engagement with the pipe T 12 and an externally threaded outlet portion 22 at the other end for engagement with a hose coupling 13. The bore of the inlet portion is in coaxial relationship with the said body 16 and at a point intermediate the length of the valve body, this bore is enlarged in diameter to form a valve seat 24. A valve bore or duct 26 extends in coaxial relationship with the body 16, a distance toward the outlet 22 and is of sufficient diameter to allow a free-sliding relationship with a valve element 28. The duct 26 is of sufficient length to extend to the lowermost portion of the valve element 28 when said valve element 28 is vertically disposed and in the completely open position. The valve element 28 will be fully described hereafter in this disclosure.

As best illustrated in Fig. 2, the valve bore or duct is provided with a plurality of hemi-cylindrical channels 30 equally spaced about the periphery thereof and extending from the valve seal 24 in a downward direction to the end of the valve duct for the purpose of allowing water to bypass the valve element 28.

Referring again to Fig. 1, an outlet bore 32, is in coaxial alignment with and extending downward from the channels 30 and is of a diameter equal to the valve bore 26 plus the channel 30 diameter.

The body 16 is also provided with an entrance bore in the outer periphery thereof to threadedly engage a hollow plug 34 and allow insertion of the actuating arm 36.

As best illustrated in Fig. 5, the valve element 28 is in the general shape of a cylinder of a diameter to allow free sliding relationship with the aforementioned valve bore or duct 26. A coaxially located threaded bore is provided in the end adjacent the valve seat 24 to engage a valve screw 38. The valve screw 38 holds in position a valve washer 40, made of hard rubber or other similar material, substantially of the same external diameter as the valve element 28. The valve washer 40 is provided with a bore for insertion of the valve screw 38 so that it may be held in coaxial relationship with the valve element 28. The valve washer 40 maintains the diameter of the valve element 28 for a short distance above the said valve element 28, then tapers conically to a smaller diameter, the angle of taper being such as to produce a good seating relationship against the valve seat 24 when the valve element 28 is in the closed position. The head 44 of the valve screw 38 is of a diameter to allow the head 44 to enter the supply bore 18 without touching the wall thereof.

The lower extremity of the valve element 28 is tapered conically to a smaller diameter and is provided with a hemi-cylindrical slot 46 which is longitudinally arcuate and transversely concave.

Referring again to Fig. 1, the lever 36 passes through and is pivotally mounted in the hollow plug 34 in such a manner as to be operatively engaged with the arcuate slot 46 in the lower portion of the valve element 28.

As best shown in Fig. 3, the plug 34 is generally cylindrical in form and is provided with a threaded portion 48 to engage the bore 33. At a point along the axis of the plug 34 and slightly beyond the threaded portion 48, the diameter of the plug 34 is expanded to form a shoulder 50. Between the threaded portion 48 and the shoulder 50 a gasket 52 is mounted. The gasket 52 is compressed between a shoulder 50 and the flattened portion of the valve body 16, and effectively prevents leakage at the engagement of the plug 34 and the bore 33. The outer diameter at the shoulder 50 is continued for the remainder of the length of the plug which is also provided with a coaxially positioned bore 56 which extends from the end of the threaded portion 48 a short distance past the shoulder 50, at which point the diameter of the bore 56 is increased to slightly less than the outer diameter of the shoulder 50. The increased diameter of the bore 56 forms a chamber 60 within the entrance element 34, said chamber 60 being for the purpose of holding in position a sealer ring 62. The sealer ring 62 is of rubber or other deformable material and is of sufficient external diameter to bear peripherally against the chamber 60, and is provided with a bore 64 of slightly smaller diameter than that of the actuating arm 36, so that sufficient peripheral pressure is exerted by the sealer ring 62 against the outer periphery of the chamber 60 and the lever 36 to effectively prevent leakage therethrough.

The outer wall 58 of the chamber 60 is provided with an ovate opening 66 which is located in such a manner as to insure that that portion of the wall 58 at the lower end of the ovate opening constitutes a stop for the lever 36. In other words, the lower arc of the ovate opening 66 acts as a stop for the lever 36 when the said lever 36 carries an applied load, the weight of a hose 76, thereby prohibiting overloading the pivot pin 72.

At a point along the longitudinal axis of the plug 34 and lying so as to be wholly within the wall 68 formed by the shoulder 50 and the expanded diameter of the bore 56, a radially positioned bore 70, the longitudinal axis of which is perpendicular to the longitudinal axis of the previously mentioned ovate opening 66, is provided in the plug 34 to receive a pivot pin 72, which allows pivotal mounting of the lever 36 within the plug 34.

The lever 36 extends beyond the plug 34 inward of the valve body 16 a sufficient distance to allow the cooperation of said lever 36 with the valve element 28, and outward of the end 58 of the plug 34 a considerable distance the lever 36 is provided with a curved cradle or hook portion for the purpose of holding the hose 76, the weight of which actuates the arm 36 producing an upward force against the valve element 28, bringing the valve washer 40 into peripheral contact with the valve seat 24.

In use, the hose operated valve operates in the following manner: The threaded portion at the supply end 20 of the valve body 16 is engaged with a supply pipe 10 in a manner similar to that shown in the drawings, so water may be introduced into the inlet 18. A hose coupling 13 is engaged with the threaded portion at the outlet 22 and the hose 76 extends therefrom. When not in use, a major portion of the hose 76 is hung in the curved cradle portion of the lever 36, the weight of said hose 76 causing a vertical downward force on the lever 36. The vertical downward load is reversed by the pivot pin 72 within the plug 34 causing a vertical upward thrust by the lever 36 on the valve element 28. The valve washer 40 then moves upward with the valve element 28 to engage the valve seat 24 with sufficient pressure to prevent leakage of water between the said valve washer 40 and the valve seat 24. Removal of the hose 76 from the curved portion of the lever 36 removes the greater portion of the vertical upward load against the valve element 28, the load remaining being the weight of the lever 36 acting at the center of gravity thereof. The remaining load is overcome by the force exerted on the upper end of the valve element 28 by the water pressure, said force moving the valve element 28 in a downward direction. The water then flows past the valve washer 40 and through the plurality of channels 30 past the valve element 28 into the outlet bore 32, and into the hose 76.

Leakage of water past the threaded portion 48 of the plug 34 is effectively prevented by the gasket 52 between the shoulder 50 of the plug 34 and the flattened portion 54 of the valve body 16, and leakage is prevented through the ovate opening 66 by means of the sealer ring 62, which is compressed and forced through the bore 56 and into the chamber 60 before the arm 36 and the pivot pin 72 are inserted into the plug 34, and before the plug 34 is screwed into the entrance bore 33 in the valve body 16.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

However, no significant change in form is required to adapt the device for secondary use in the home, factory or the like as a holder for an emergency fire hose since the outlet end of the hose need not be closed.

I claim:

1. A hose operated valve comprising: a generally cylindrical hollow valve body having inlet means for attachment to a source of pressurized water supply; said body also having outlet means for connection thereof to a water hose; said body having a duct interconnecting said inlet and outlet means; a valve element operatively mounted within said duct and in slidable relationship with said body; an external lever pivoted on said body and having a portion extending within said body and operatively engaged with said valve element; said duct having a cross-sectional area greater than said valve element and constituting a by-pass around said valve element when the valve is open; and said body having a radially disposed bore leading from the exterior of said valve body to said duct, a hollow plug secured in said bore; said lever extending through said plug; said plug having a pivot pin whereon said lever is pivoted; said plug having an enlarged chamber at the side of said pivot pin remote from said valve element; and a sealing element within said chamber, encircling said lever and sealing said lever with reference to the chamber.

2. A hose operated valve comprising: a generally cylindrical hollow valve body having inlet means for attachment to a source of pressurized water supply; said body also having outlet means for connection thereof to a water hose; said body having a duct interconnecting said inlet and outlet means; a valve element operatively mounted within said duct and in slidable relationship with said body; an external lever pivoted on said body and having a portion extending within said body and operatively engaged with said valve element; said duct having a cross-sectional area greater than said valve element and constituting a by-pass around said valve element when the valve is open; and said body having a radially disposed bore leading from the exterior of said valve body to said duct, a hollow plug secured in said bore; said lever extending through said plug; said plug having a pivot pin whereon said lever is pivoted; said plug having an enlarged chamber at the side of said pivot pin remote from said valve element; and a sealing element within said chamber and sealing said lever; said chamber being bounded in part by an external wall having an ovate opening therein; the longitudinal axis of said opening being parallel to the valve body axis; and the width of said ovate opening being very slightly greater than the diameter of said external lever; the portion of said wall at one end of said opening comprising a stop for the lever in the position thereof when the valve is closed, whereby said pivot pin is protected from undue pressure thereon when a hose is supported on said lever.

References Cited in the file of this patent

UNITED STATES PATENTS

| | | |
|---|---|---|
| 582,062 | Hurst | May 4, 1897 |
| 632,747 | Randolph | Sept. 12, 1899 |
| 663,979 | Obrien | Dec. 18, 1900 |
| 985,166 | Hall | Feb. 28, 1911 |
| 1,600,993 | Painter | Sept. 28, 1926 |
| 1,686,336 | Meyers | Oct. 2, 1928 |
| 2,115,259 | Goldkamp | Apr. 26, 1938 |
| 2,409,765 | Kehle | Oct. 22, 1946 |
| 2,417,546 | DeGiers | Mar. 18, 1947 |
| 2,524,730 | Lawhon | Oct. 3, 1950 |
| 2,608,207 | Le Van | Aug. 26, 1952 |
| 2,675,206 | Lindberg | Apr. 13, 1954 |
| 2,767,019 | Manville | Oct. 16, 1956 |

FOREIGN PATENTS

| | | |
|---|---|---|
| 411,276 | Great Britain | June 7, 1934 |
| 779,114 | France | of 1935 |
| 808,514 | France | of 1937 |
| 900,047 | France | of 1945 |